(12) United States Patent
Shin

(10) Patent No.: US 7,690,907 B2
(45) Date of Patent: Apr. 6, 2010

(54) MULTI-FILM JUNCTION STRUCTURE

(75) Inventor: Kwang Seob Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 831 days.

(21) Appl. No.: 11/469,539

(22) Filed: Sep. 1, 2006

(65) Prior Publication Data

US 2007/0141190 A1 Jun. 21, 2007

(30) Foreign Application Priority Data

Dec. 21, 2005 (KR) ........................ 10-2005-0127348

(51) Int. Cl.
*B32B 3/10* (2006.01)
(52) U.S. Cl. ........................ 425/123; 428/57; 428/189
(58) Field of Classification Search .................. 428/57, 428/189; 425/123; 264/263
See application file for complete search history.

(56) References Cited

U.S. PATENT DOCUMENTS

| | | | | |
|---|---|---|---|---|
| 5,066,353 | A * | 11/1991 | Bourdo | 156/300 |
| 5,133,912 | A * | 7/1992 | Hagiwara et al. | 264/46.4 |
| 5,304,273 | A * | 4/1994 | Kenrick et al. | 156/219 |
| 6,093,272 | A * | 7/2000 | Visconti et al. | 156/219 |
| 6,214,157 | B1 * | 4/2001 | Spengler | 156/304.6 |
| 6,673,296 | B2 * | 1/2004 | Hiraiwa et al. | 264/275 |
| 6,946,179 | B2 * | 9/2005 | Hansen et al. | 428/57 |
| 2003/0124275 | A1 * | 7/2003 | Hansen et al. | 264/263 |

FOREIGN PATENT DOCUMENTS

| KR | 200250791 | 11/2001 |
|---|---|---|
| KR | 10-20060043154 | 5/2006 |

* cited by examiner

*Primary Examiner*—Robert B Davis
(74) *Attorney, Agent, or Firm*—Greenblum & Bernstein P.L.C.

(57) ABSTRACT

A multi-film junction structure includes an upper mold having a downwardly extending protrusion formed at a lower surface thereof to allow a recess to be defined in resin that is injected therearound. A first film is attached to a part of the lower surface of the upper mold and a side surface and lower surface of the protrusion, the first film having an extension extended from the lower surface of the protrusion by a predetermined length. A second film is attached to a remaining lower surface of the upper mold and an opposite side surface of the protrusion, the second film having a coupling portion located inside the extension of the first film, wherein the extension is bent upwardly. Additionally, a lower mold is provided having a recess facing the protrusion of the upper mold while being spaced apart from the protrusion, the lower mold defining an injection molding space together with the upper mold for allowing resin to be introduced and injection molded in the space.

3 Claims, 3 Drawing Sheets

PRIOR ART

MULTI-FILM JUNCTION STRUCTURE

BACKGROUND OF THE INVENTION

1. Field of the Invention

The present invention relates to a multi-film junction structure, and more particularly, to a multi-film junction structure for attaching films having different colors from one another to an injection molded article of a vehicle with high stability.

2. Description of the Related Art

Generally, a vehicle is provided, in a passenger compartment thereof, with a center fascia on which an audio system, air conditioner operating panel and navigation system are arranged. Films having different colors from one another are bonded to an outer surface of the center fascia for the sake of interior decoration.

FIG. 1 is a sectional view illustrating a conventional multi-film junction structure.

Conventionally, a center fascia of a vehicle is formed of a single injection molded panel, but provided, at a center portion and both side portions thereof, with different colors of films, respectively.

As shown in FIG. 1, the conventional multi-film injection structure comprises: a first injection molded part 30 having either side portion downwardly bent by a right angle to form a stepped portion 32, a flat plane portion 35 extending from the stepped portion 32, and a protrusion 37 protruded upward from the flat plane portion 35 at a distal end position of the flat plane portion 35; a first film 40 attached along the stepped portion 32 and flat plane portion 35 of the first injection molded part 30, the first film 40 being inserted through a lower portion of the protrusion 37 on the flat plane portion 35; a second injection molded part 50 having one end connected to the protrusion 37 of the first injection molded part 30; and a second film 60 attached along the end of the second injection molded part 50.

In the above described conventional multi-film junction structure, the first and second injection molded parts 30 and 50 are connected to each other to constitute a single injection molded panel suitable for forming a module housing of a center fascia. Accordingly, the first film 40 is a film arranged on the center portion of the center fascia, and the second film 60 is a film arranged on either side portion of the center fascia.

On the condition that the single panel, which is constituted by the first and second injection molded parts 30 and 50, refers to the module housing, the first and second films are interior decorative films forming an outer surface of the module housing, and a boundary is defined between the first film 40 and the second film 60.

Here, the first and second films have different colors from each other, and are attached to the module housing while defining a boundary therebetween, prior to injection molding the module housing. Specifically, prior to injection molding the module housing by use of a mold 25, the first and second films are arranged on an inner surface of the mold 25, and then, liquid-phase resin is injected into the mold 25 by use of an injector of an injection molding apparatus. With an injection pressure of the liquid-phase resin, thereby, the first and second films are attached to the module housing while defining a boundary therebetween.

The conventional multi-film junction structure having the above described configuration, however, has a problem in that the resin may be concentrated on the boundary of the first and second films, causing the boundary to be contaminated thereby. This results in an injection molding of defective module housings, and is problematic in the stability of junction between ends of the first and second films.

SUMMARY OF THE INVENTION

Therefore, the present invention has been made in view of the above problems, and it is an object of the present invention to provide a multi-film junction structure, which can prevent resin from moving to a boundary between different films, which are attached to an injection molded article, while achieving high stability of junction between ends of the different films.

In accordance with the present invention, the above and other objects can be accomplished by the provision of a multi-film junction structure comprising: an upper mold having a downwardly extending protrusion formed at a lower surface thereof to allow a recess to be defined in resin that is injected therearound; a first film attached to a part of the lower surface of the upper mold and a side surface and lower surface of the protrusion, the first film having an extension extended from the lower surface of the protrusion by a predetermined length; a second film attached to the remaining lower surface of the upper mold and an opposite side surface of the protrusion, the second film having a coupling portion located inside the extension of the first film in a state wherein the extension is bent upwardly; and a lower mold having a recess facing the protrusion of the tipper mold while being spaced apart from the protrusion, the lower mold defining an injection molding space together with the upper mold for allowing resin to be introduced and injection molded in the space.

Preferably, the extension of the first film may be formed, at a lower surface thereof, with a notch for allowing the extension to be easily bent toward the coupling portion of the second film.

Preferably, the extension of the first film may be formed with a serration, into which the resin is introduced. Here, the serration is not limited to be formed only at the extension of the first film, and thus, may be formed at the coupling portion of the second film.

Meanwhile, the extension of the first film and the coupling portion of the second film may have a length less than 0.3 mm, respectively.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be explained with reference to the accompanying drawings.

Figure 1:
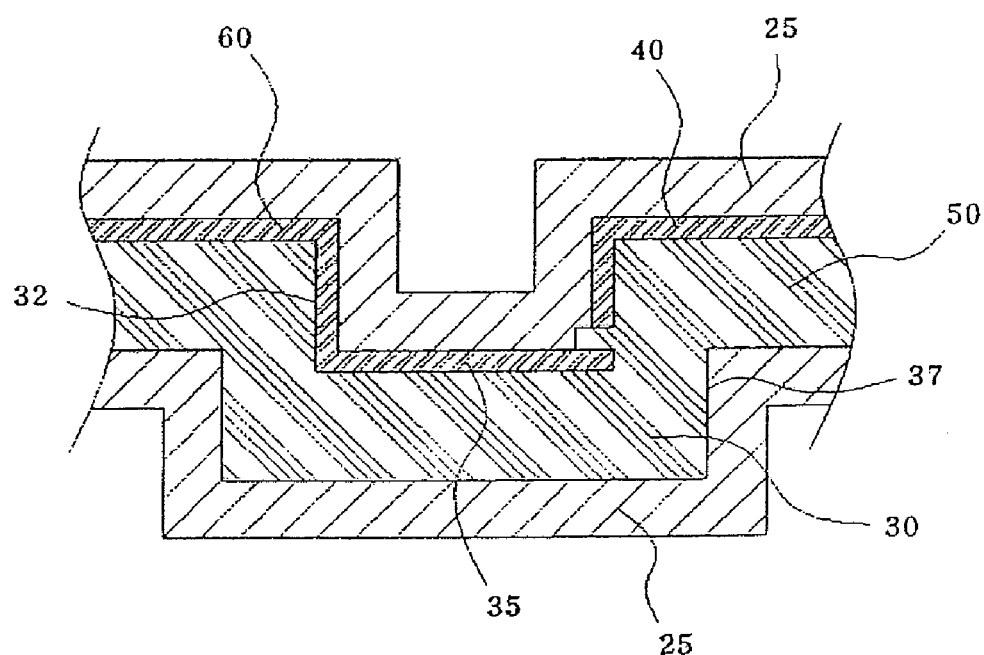
FIG. 1 is a sectional view illustrating a conventional multi-film junction structure.
Figure 2:
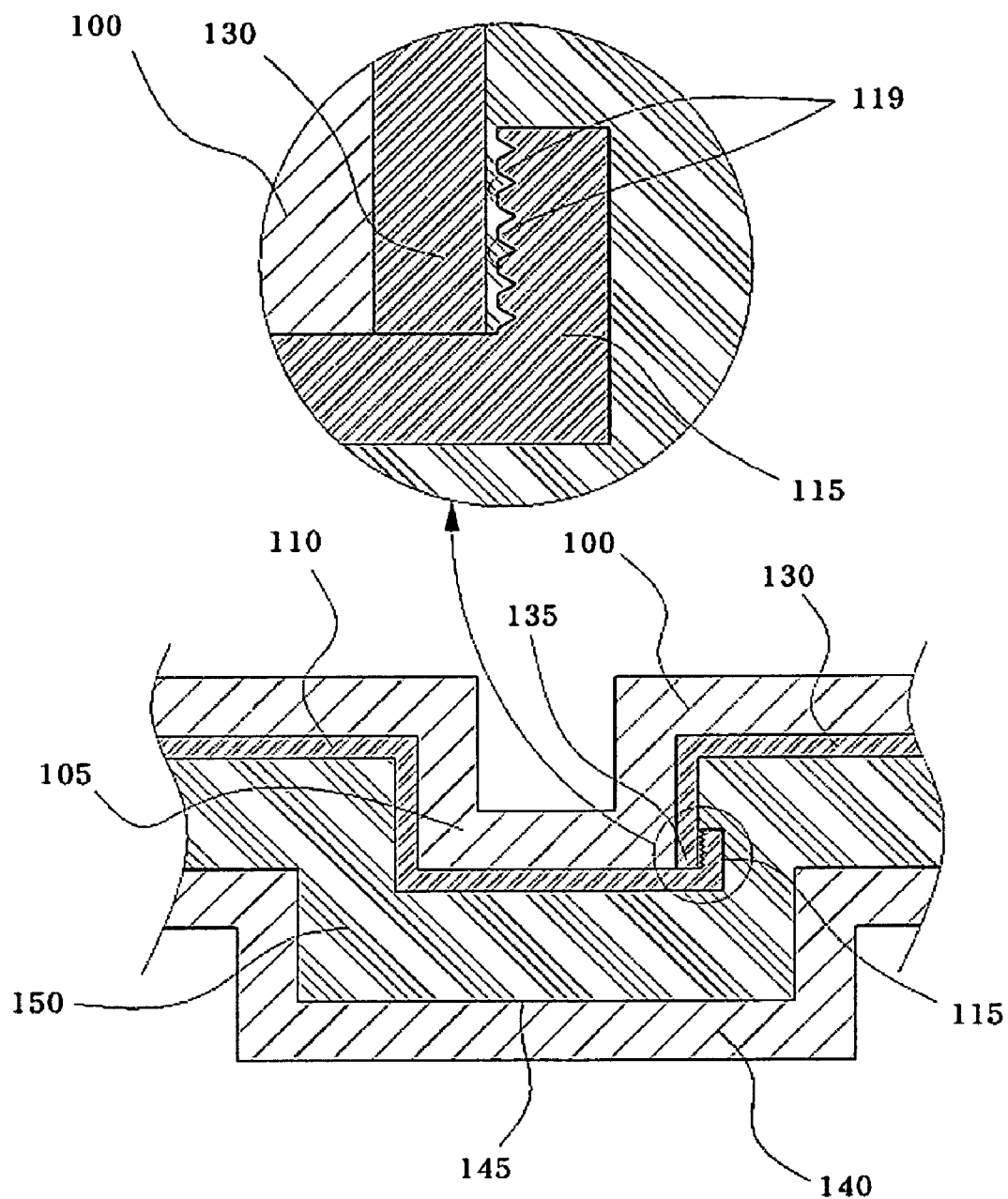
FIG. 2 is a sectional view illustrating a multi-film junction structure according to a first embodiment of the present invention.
Figure 3:
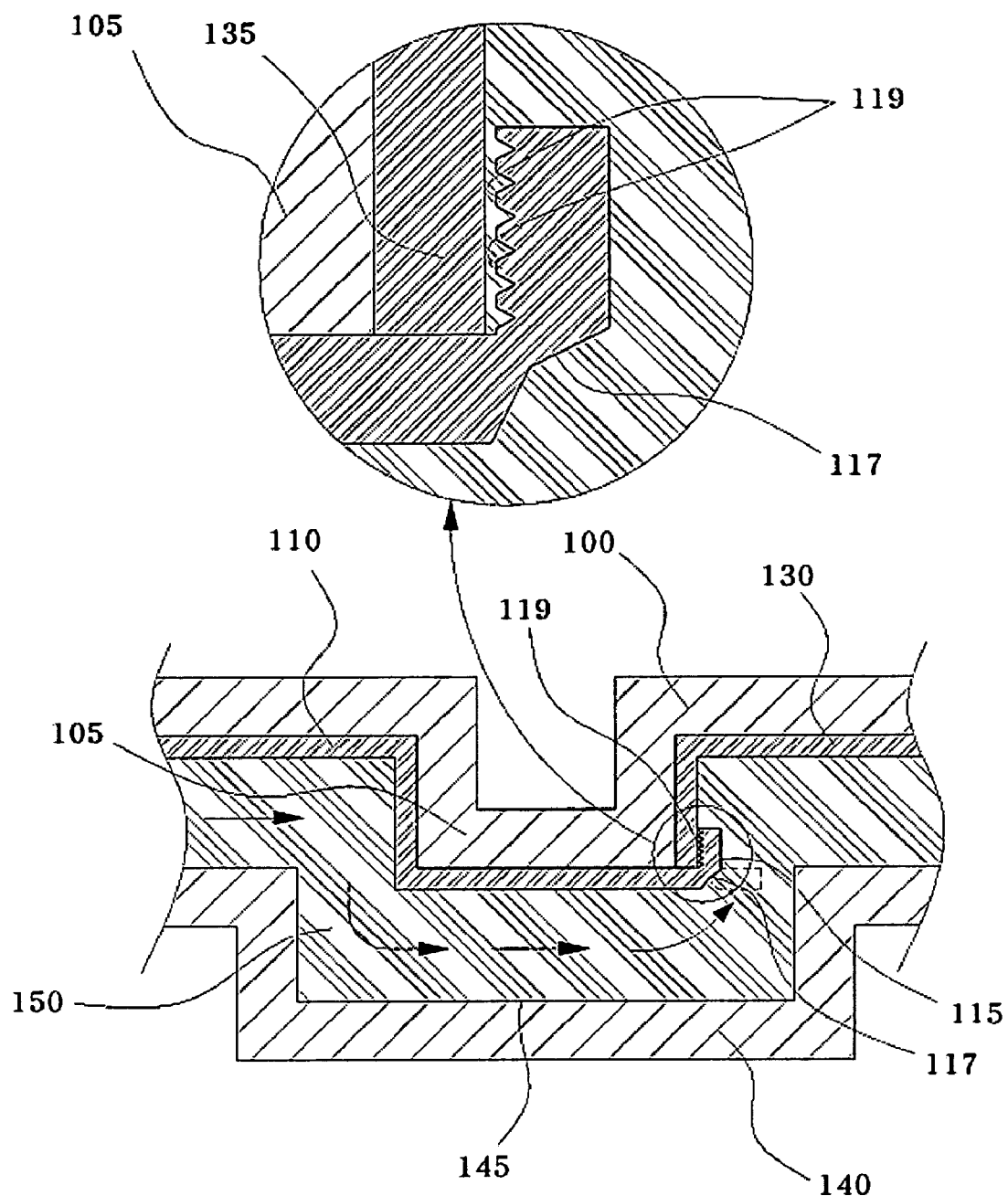
FIG. 3 is a sectional view illustrating a multi-film junction structure according to a second embodiment of the present invention.

FIG. 2 is a sectional view illustrating a multi-film junction structure according to a first embodiment of the present invention, and FIG. 3 is a sectional view illustrating a multi-film junction structure according to a second embodiment of the present invention.

As shown, the multi-film junction structure according to the present invention comprises: an upper mold 100 having a downwardly extending protrusion 105 formed at a lower surface thereof, the protrusion 105 allowing a recess to be defined in resin that is injected therearound; a first film 110 attached to a part of the lower surface of the upper mold 100 and a side surface and lower surface of the protrusion 105, the first film 110 having an extension 115 extended from the lower surface of the protrusion 105 by a predetermined length; a second film 130 attached to the remaining lower surface of the upper mold 100 and an opposite side surface of the protrusion 105, the second film 130 having a coupling portion 135 located inside the extension 115 of the first film 110 in a state wherein the extension 115 is bent upwardly; and a lower mold 140 having a recess 145 facing the protrusion 105 of the upper mold 100 while being spaced apart from the protrusion 105, the lower mold 140 defining an injection molding space 150 together with the upper mold 100 for allowing resin to be introduced and injection molded in the space 150.

Specifically, the first film 110 and second film 130 are first attached to the upper mold 100, and then, the upper mold 100 is coupled to the lower mold 140 to define the injection molding space 150 therebetween. Thereafter, if resin is injected into the injection molding space 150, the resin is molded within the injection molding space 150 to form a module housing, to which an audio module or air conditioner operating module of a center fascia will be mounted. In the present invention, the extension 115 of the first film 110 surrounds the coupling portion 135 of the second film 130, and therefore, it is possible to prevent resin from moving upward out of a film structure constituted by the first and second films 110 and 130.

More specifically, as a result of preventing a gap from being defined between the extension 115 of the first film 110 and the coupling portion 135 of the second film 130, there is no risk in that resin is discharged upward out of the film structure from a boundary between the first film 110 and the second film 130, and therefore, deterioration in the outer appearance of the first and second films 110 and 130 can be completely prevented.

Also, it is noted that the extension 115 of the first film 110 has to be bent upward by a right angle and joined to the coupling portion 135 of the second film 130, prior to injecting resin between the upper mold 100 and the lower mold 140.

Here, the first and second films 110 and 130, which are attached to the lower surface of the upper mold 100, are films to be arranged on a center fascia of a vehicle, and the injection molding space 150 between the upper and lower molds 100 and 140 is used to perform an injection molding of a module housing, to which an audio module or air conditioner operating module of the center fascia will be mounted.

Accordingly, attaching the first film 110 and second film 130, which have different colors from each other, to an outer surface of the center fascia has the effect of providing the center fascia with improved outer appearance. Furthermore, the extension 115 of the first film 110 and the coupling portion 135 of the second film 130 can efficiently achieve a strong junction between the first and second films 110 and 130.

In a case where the resin is injected into the injection molding space 150 between the upper mold 100 and the lower mold 140 to form the module housing, the first film 110 may be positioned at the center portion of the module housing, and the second film 130 may be positioned at either side portion of the module housing.

Considering a second embodiment of the present invention as shown in FIG. 3, the extension 115 of the first film 110 may be formed, at a lower surface thereof, with a notch 117. The notch 117 allows the extension 115 to be easily bent toward the coupling portion 135 of the second film 130. The extension 115 formed with the notch 117, accordingly, can be easily bent toward the coupling portion 135 by a pressure applied by the resin being injected into the injection molding space 150 between the upper mold 100 and the lower mold 140.

Also, the extension 115 of the first film 110 is formed with a serration 119 for allowing introduction of resin. That is, as the resin is introduced into the injection molding space 150 between the upper mold 100 and the lower mold 140, the resin is also introduced into the serration 119 serving as a gap formed in the extension 115, thereby achieving a strong junction between the extension 115 of the first film 110 and the coupling portion 135 of the second film 130 using the resin.

The extension 115 of the first film 110 and the coupling portion 135 of the second film 130 have a length less than 0.3 mm, respectively. Once the extension 115 of the first film 110 is bent toward the coupling portion 135 of the second film 130, there is no risk of discharge of resin out of the first and second films 110 and 130 through a boundary between the coupling portion 135 and the extension 115.

As apparent from the above description, the present invention provides a multi-film junction structure, which can prevent resin from moving to a boundary between different films to be attached to an injection molded article, thereby achieving improved outer appearance of an injection molded article. Further, the present invention has the effect of achieving high stability of junction between ends of the different films.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-film junction structure, comprising:
   an upper mold having a downwardly extending protrusion formed at a lower surface thereof to allow a recess to be defined in resin that is injected therearound;
   a first film attached to a part of the lower surface of the upper mold and a side surface and lower surface of the protrusion, the first film having an extension extended from the lower surface of the protrusion by a predetermined length;
   a second film attached to a remaining lower surface of the upper mold and an opposite side surface of the protrusion, the second film having a coupling portion located inside the extension of the first film, wherein the extension is bent upwardly; and
   a lower mold having a recess facing the protrusion of the upper mold while being spaced apart from the protrusion, the lower mold defining an injection molding space together with the upper mold to allow resin to be introduced and injection molded in the space,
   wherein a space is provided between the extension and the coupling portion in a direction perpendicular to the protruding direction of the protrusion so that the resin may be captured therebetweeen, and
   wherein the extension of the first film is formed, at a lower surface thereof, with a notch that allows the extension to be easily bent toward the coupling portion of the second film.

2. The structure according to claim 1, wherein the extension of the first film is formed with a serration, into which the resin is introduced.

3. The structure according to claim 1, wherein the extension of the first film and the coupling portion of the second film have a length less than 0.3 mm, respectively.

* * * * *